United States Patent
Kuniyoshi et al.

[15] 3,696,278
[45] Oct. 3, 1972

[54] CONTROLLING APPARATUS FOR A D.C. BRUSHLESS MOTOR

[72] Inventors: Masateru Kuniyoshi, Yokohama; Hayatoshi Yamada, Tokyo; Katsumi Fukasawa; Yoshiaki Tamura, both of Kawasaki, all of Japan

[73] Assignee: Tokyo-Shibaura Electric Co., Ltd., Kawasaki-shi, Japan

[22] Filed: Nov. 25, 1970

[21] Appl. No.: 92,796

[30] Foreign Application Priority Data

Nov. 25, 1969 Japan ......................44/94134

[52] U.S. Cl. ...................318/138, 318/227, 318/230
[51] Int. Cl. ...........................................H02k 29/00
[58] Field of Search.......318/138, 227, 230, 387, 398

[56] References Cited

UNITED STATES PATENTS

| | | |
|---|---|---|
| 3,444,451 | 5/1969 | Schlabach et al..........318/227 |
| 3,372,323 | 3/1968 | Guyeska.....................318/230 |
| 3,546,551 | 12/1970 | Risberg et al..........318/230 X |

*Primary Examiner*—Gene Z. Rubinson
*Attorney*—Oblon, Fisher & Spivak

[57] ABSTRACT

A brushless D.C. motor is supplied an A.C. voltage from a polyphase thyristor bridge inverter which functions as a static commutator. A controllable rectifier is provided for supplying a D.C. voltage to the inverter. There is also provided a starting control circuit which causes the rectifier to act as an inverter during every commutation of the thyristor bridge inverter, rapidly turning off the thyristors in the inverter. The starting control device also functions to cause the commutator lead angle of the thyristor bridge inverter to remain substantially zero while the rotational speed of the motor is less than a predetermined value. Thus, it is possible to excite the armature winding of the motor with the maximum rated voltage to derive the maximum torque therefrom.

3 Claims, 2 Drawing Figures

PATENTED OCT 3 1972

3,696,278

INVENTORS
MASATERU KUNIYOSHI
HAYATOSHI YAMADA
KATSUMI FUKASAWA
YOSHIAKI TAMURA

BY *Roy, Fisher & Spivak*

ATTORNEYS

CONTROLLING APPARATUS FOR A D.C. BRUSHLESS MOTOR

BACKGROUND OF THE INVENTION

The present invention relates to a control system for a brushless D.C. motor, in which a polyphase thyristor bridge inverter is used for energizing the armature winding of the motor.

Generally, in a brushless D.C. motor having a polyphase thyristor bridge inverter which functions as a static commutator, the back electromotive force generated in the armature winding of the motor is employed to effect commutation among the thyristors in the bridge, which become conductive in a predetermined order. However, it is difficult to start a brushless D.C. motor using such natural commutation, because the back electromotive force to be used for the commutation is not yet established when the motor is to be started.

In the prior art mode of starting brushless D.C. motors, an intermittent D.C. voltage is initially applied to the thyristor bridge inverter during an appropriate time interval. After the motor speed has risen to a predetermined value, so that the back electromotive force of the armature winding is sufficiently established, the intermittent D.C. voltage is replaced by a continuous D.C. voltage. Since there is little back electromotive force upon starting the motor in such devices, the thyristor bridge inverters may experience severe failure of commutation. That is, a simultaneous conduction of serially connected thyristors in the same arm of the bridge may occur, with the result that the D.C. power supply is short-circuited through the thyristor bridge inverter.

Accordingly, in such prior starting apparatuses, it was necessary to use expensive circuit elements sufficiently heavy to survive occasional short circuit currents.

In addition, if the stoppage period of the D.C. power supply be defined as the time required to discharge the electromagnetic energy stored in the armature winding and in a smoothing reactor connected between the D.C. voltage supply and the thyristor bridge inverter, it was necessary in such prior art circuits that the circuit constants be selected according to the aforesaid stoppage period. Consequently, there was no freedom for the selection of the circuit constants.

Finally, because the thyristor bridge inverters in prior circuits were operated at the same commutator lead angle during starting as in normal running operation, such circuits did not generate the maximum starting current. Consequently, such prior circuits did not maximize the starting torque of the D.C. motors they controlled.

SUMMARY OF THE INVENTION

Accordingly, it is one object of this invention to provide a control system for a brushless D.C. motor, having a thyristor bridge inverter employed as a static commutator, capable of rapidly starting the motor without danger of failure of commutation of the thyristor bridge inverter.

Another object of the invention is to provide a control system for a brushless D.C. motor, in which the current capacity of the circuit elements used can be effectively reduced, thereby permitting manufacture of a control system which is relatively small in size, easy to maintain and inexpensive.

Still another object of the invention is to provide a control system for a brushless D.C. motor, in which the circuit constants of the control system can be freely selected.

Another object of the invention is to provide a control system for a brushless D.C. motor, in which the motor can be started with a maximum torque.

Briefly, these and other objects of the invention are achieved by supplying a brushless D.C. motor with an A.C. voltage from a polyphase thyristor bridge inverter, which functions as a static commutator. A controllable rectifier is provided for supplying a D.C. voltage to the inverter. A starting control circuit, responsive to angular positions of the motor's rotor and to the rotational speed of the motor is provided to cause the rectifier to act as an inverter periodically. The starting control circuit also causes the commutator lead angle of the thyristor bridge inverter to remain substantially zero until the rotational speed of the motor is greater than a predetermined value.

BRIEF DESCRIPTION OF THE DRAWINGS

The present invention will be more fully understood from the following description when taken in connection with the accompanying drawings, wherein.

DETAILED DESCRIPTION OF THE PREFERRED EMBODIMENT

Figure 1:
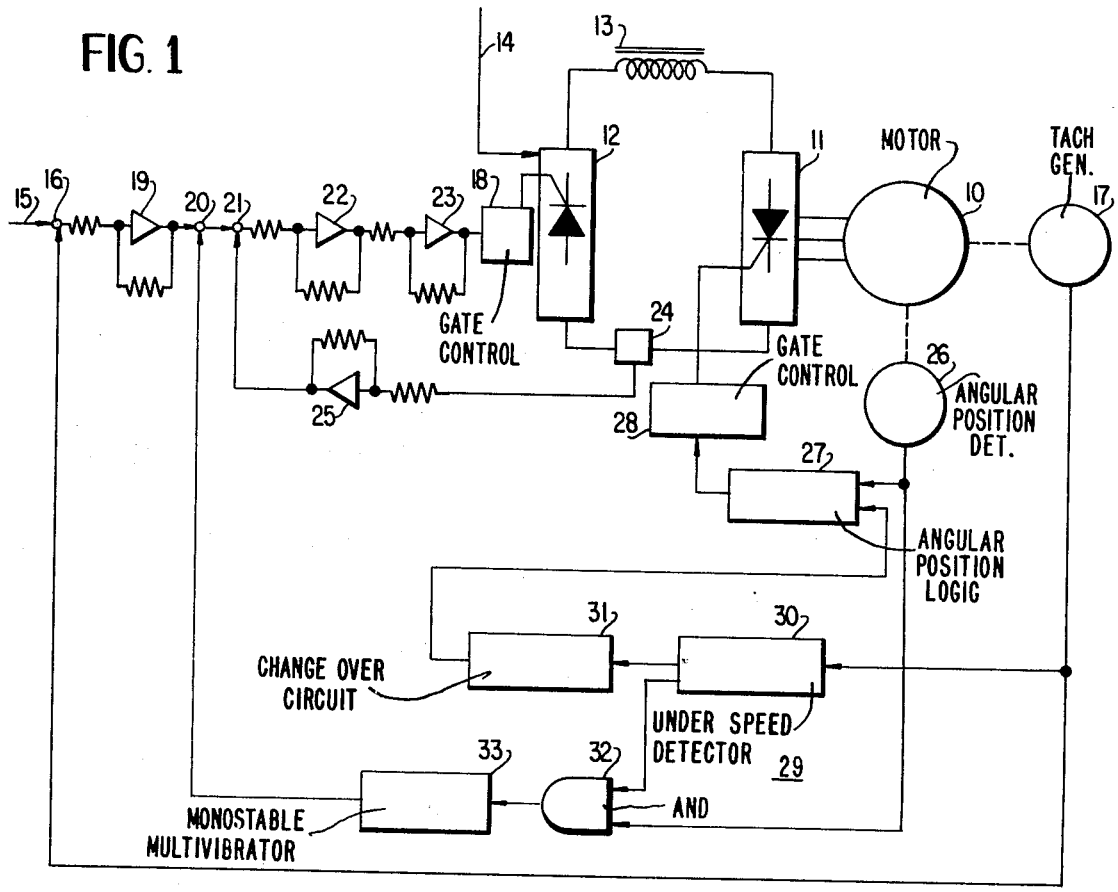
FIG. 1 is a block diagram of the preferred embodiment of a control system for a brushless D.C. motor according to the invention; and, FIG. 2 shows typical waveforms illustrating the operation of the rectifier included in FIG. 1.

Referring now to FIG. 1, a brushless D.C. motor, generally shown with a reference numeral 10, includes a polyphase stator winding and a D.C. excited rotor, which are not separately illustrated because they are of conventional type.

In order to supply an A.C. voltage to the stator winding of the motor 10, there is provided a polyphase thyristor bridge inverter 11, which may be of the three phase bridge type, for example, which functions as a static commutator for motor 10.

A controllable rectifier 12, which has substantially the same construction as that of the inverter 11, is provided for supplying a D.C. voltage to the inverter 11 through a smoothing reactor 13. The controllable rectifier 12 is energized from an A.C. voltage source (not shown) through line conductors 14.

To control the speed of motor 10, a reference voltage is provided through a conductor 15 to an adder 16, where the reference voltage is combined with a voltage generated from a tachometer generator 17 which is mechanically coupled to the motor 10. The error signal derived from the adder 16 is then conducted to a gate control circuit 18 of the rectifier 12 through an operational amplifier 19, adders 20 and 21 and operational amplifiers 22 and 23. The gate control circuit 18 is preferably a conventional gate control circuit of the type described in Chapter 8 of the *Silicon Controlled Rectifier Mannual*, third edition (1964), published by the General Electric Co. In this manner, the gate control angle of the rectifier 12 is adjusted to impress regulated D.C. voltages on the inverter 11 such that the speed of motor 10 is held at a value predetermined by the reference voltage.

To protect the rectifier 12 from overloading, a direct current transformer 24 is provided in the D.C. output circuit of the rectifier 12 for applying a feedback current signal to adder 21 through an operational amplifier 25. The direct current transformer 24 is preferably a conventional device of the type described in Chaper 10, Section 19 of *Magnetic Amplifier*, by H. F. Storm (1955), published by John Wiley & Sons, Inc. The error signal derived from adder 21 is fed to the gate control 18 to hold the output current level of the rectifier 12 below a predetermined amplitude.

An angular position detector 26 is mechanically connected to the rotor shaft of motor 10 in order to detect angular positions of the revolving field type rotor with respect to the stator winding. The output signals derived from the detector 26 are fed to one input of a logic circuit 27, the output of which is coupled to a gate control circuit 28 which controls the operation of inverter 11. The logic circuit 27 may be a conventional circuit of the type described in Paper No. 395 of *The 1966 Joint Convention Record Of The Institute Of Electrical Engineers*, Japan. Similarly, the gate control circuit 28 is preferably a conventional gate control circuit of the type described in Chapter 8 of the *Silicon Controlled Rectifier Mannual*, noted above. More particularly, the thyristors in inverter 11 are sequentially turned on by gate control 28 in a predetermined order to energize the phase windings of the stator in the same predetermined order.

For starting brushless D.C. motor 10, a starting circuit 29 is provided. The starting circuit 29 includes an under speed detecting circuit 30, which may be a conventional Schmidt trigger circuit for example, responsive to the output of the tachometer generator 17. The under speed detecting circuit 30 generates an output only when the speed of the motor 10 is less than a predetermined value. The output of the under speed detector 30 is supplied to a changeover circuit 31, which may be a conventional digital NOT circuit for example, as well as to an AND gate 32.

The output from the changeover circuit 31 is fed to the logic circuit 27 along with the previously described signals from the angular position detector 26. When these signals are simultaneously applied to the logic circuit 27, the output of the circuit 27 causes the gate control circuit 28 to make the commutator lead angle of the inverter 11 equal to zero. In this manner, the maximum output current is supplied from the inverter 11 to the stator winding of the motor 10, and the motor 10 can thus be started with the maximum torque.

AND gate 32 also receives the output signals from the angular position detector 26, as well as signals from under speed detecting circuit 30. When these signals exist simultaneously, AND gate 27 applies its output to a monostable multivibrator 33. The output of multivibrator 33 is applied to adder 20, which causes the gate control circuit 18 to function in such a manner that the rectifier 12 can be operated as an inverter for a time interval determined by the width of the output pulse from multivibrator 33. A more detailed analysis of the manner in which a rectifier can be made to operate as an inverter is disclosed in Chapter 3 of *Principals of Inverter Circuits*, by B. D. Bedford and R. G. Hoft, published by John Wiley & Sons, Inc., New York (1964).

It will be understood that if the rectifier 12 and inverter 11 are of the three-phase bridge type, the angular position detector 26 generates its outputs at 60° phase intervals.

Figure 2:
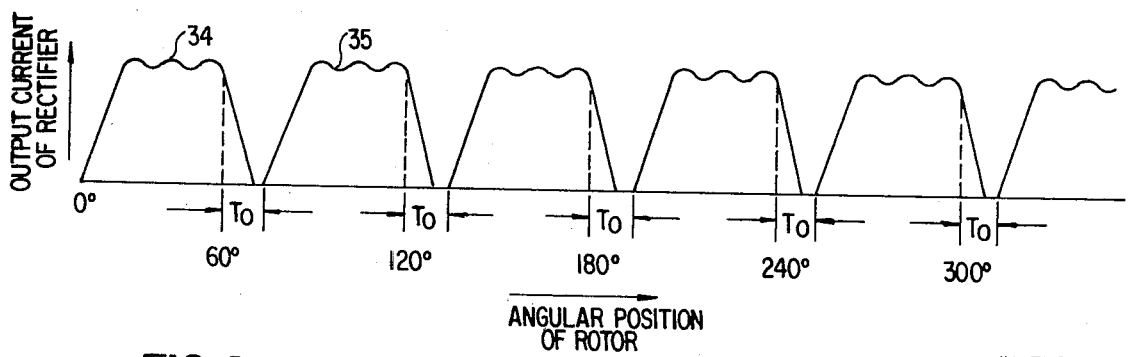

The operation upon the start of the brushless D.C. motor 10 will now be explained with reference to FIG. 2 wherein, for brevity, the output current of the rectifier 12 is illustrated when the motor 10 rotates at a constant speed at which the under speed detector generates its output. When it is intended to start motor 10, a reference voltage corresponding to the desired speed is applied to adder 16 through conductor 15. The output current generated by the rectifier 12 will then be as illustrated by a curve 34 in FIG. 2. Motor 10 will start with its maximum torque, since the commutator lead angle of the inverter 11 will remain at zero because of the low speed of the motor 10. When the rotor of motor 10 reaches an angle of 60°, the rectifier 12 will change its mode of operation to that of an inverter by transferring the gate control angle from its normal state to an angle of from 120° to 180°. Thus, the output current of the rectifier 12 will be reduced to zero, and the electromagnetic energy stored in the smoothing reactor 13 as well as in the stator winding of the motor 11 will rapidly flow back to the A.C. voltage source through the conductor 14 due to the regenerative effect.

When the rotor reaches an angle of $60° + T_o$, assuming that the rotor rotates at the above-mentioned constant speed and that $I_o$ is a rotational displacement of the rotor in a time interval $\tau$ determined by the multivibrator 33, the output pulse from the monostable multivibrator 33 ceases, and the rectifier 12 will return to its original mode of operation, supplying D.C. current as shown by curve 35 to the inverter 11. However, since the motor speed will still be slow, the commutator lead angle of the inverter 11 will remain zero, and accordingly the maximum output current will be supplied to the stator winding of the motor 10 to derive the maximum torque from the motor. In this manner, motor 10 will start quickly and accelerate rapidly to a desired speed.

When the motor speed reaches the aforesaid desired speed, the output of the tachometer generator 17 will cause the output from the under speed detecting circuit 30 to cease. As the result, the changeover circuit 31 and the logic circuit 27 will serve to return the commutator lead angle of inverter 11 to its normal value of from 30° to 80°, for example, in which case the inverter 11 can be operated as a conventional commutating inverter due to the back electromotive force of the motor 10. The rectifier 12 will generate continuous D.C. output current after the output of monostable multivibrator 33 terminates.

From the above, in accordance with the teachings of the instant invention, it will be understood that the brushless D.C. motor can be easily started with maximum torque even under a heavily loaded condition. It will further be understood that it is possible to start the brushless D.C. motor according to the instant invention without the danger of failure of the thyristor inverter thereof due to overloading. Accordingly, it is not necessary to make the electrical circuit elements larger in size so as to bear the short circuit current as would occur upon commutator failure. Further, the circuit constants including the inductance of the smoothing reactor 13 and the stator winding of the motor can be freely defined without consideration for the starting period of the motor.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the United States is:

1. A control system for a brushless D.C. motor comprising:
   an electric motor having a polyphase stator winding and a revolving field type rotor,
   a polyphase thyristor bridge inverter connected to said stator winding and functioning as a static commutator, said polyphase bridge inverter establishing a commutator phase lead angle,
   a controllable rectifier connected to the input of said inverter; and,
   a starting control circuit coupled to said motor and responsive to the speed and angular position of said rotor thereof for regulating said commutator lead angle in response to the speed of said rotor, and for causing said rectifier to act as an inverter, or as a source of continuous D.C. current to said bridge inverter depending upon the speed of said rotor.

2. A control system for a brushless D.C. motor as in claim 1, wherein:
   said starting control circuit includes,
   circuit means coupled to said motor for determining whether the rotor speed thereof is above or below a predetermined value; and,
   a changeover circuit coupled to said circuit means and to said bridge inverter for maintaining said commutator phase lead angle at a near zero value when said motor speed is below said predetermined value, and permitting said commutator phase lead angle to assume a non-zero value when said motor speed is above said predetermined value.

3. A control system for a brushless D.C. motor as in claim 1, wherein:
   said starting control circuit includes,
   circuit means coupled to said motor for determining the rotor speed thereof,
   means coupled to said rotor means for determining the angular position thereof; and,
   monostable multivibrator means coupled to said circuit means, to said angular position determining means and to said rectifier for causing said rectifier to operate periodically as an inverter.

* * * * *